Patented Aug. 4, 1936

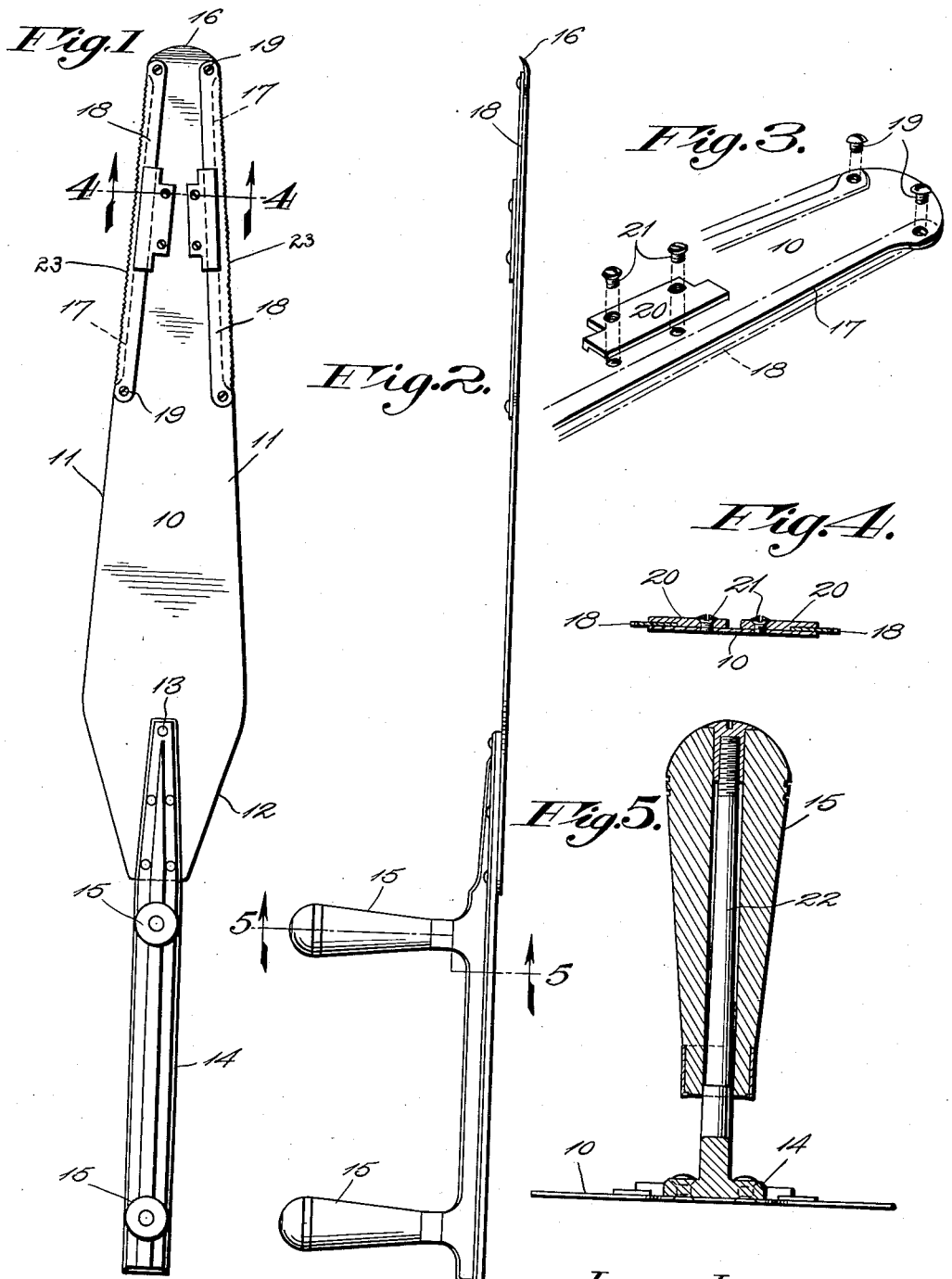

2,050,103

UNITED STATES PATENT OFFICE 2,050,103

SHINGLE REMOVING TOOL

James Lang, San Antonio, Tex.

Application November 13, 1935, Serial No. 49,630

1 Claim. (Cl. 145—1)

The invention relates to a special form of tool and more especially to a shingle removing tool.

The primary object of the invention is the provision of a tool of this character, wherein through the use of a tapered blade and saw elements attached thereto a damaged shingle can be conveniently and easily removed from a roof as the saw elements can be brought into engagement with the nails fastening the damaged shingle in place to cut such nails and thus permit the removal of the shingle without disturbing or in any way damaging the other shingles adjacent thereto of the roof structure.

Another object of the invention is the provision of a tool of this character, wherein the construction thereof is novel in form and such saw elements can be easily and conveniently removed should the same become damaged through constant use or otherwise and such tool is handy and readily and easily operated for the purposes intended thereof.

A further object of the invention is the provision of a tool of this character, which is extremely simple in construction, thoroughly reliable and effective in its operation, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a plan view of a tool constructed in accordance with the invention.

Figure 2 is an edge view thereof.

Figure 3 is an exploded fragmentary perspective view showing the manner of fastening the saw elements to the main blade of the tool.

Figure 4 is a sectional view on the line 4—4 of Figure 1 looking in the direction of the arrows.

Figure 5 is a sectional view on the line 5—5 of Figure 2 looking in the direction of the arrows.

Similar reference characters indicate corresponding parts throughout the several views in the drawing.

Referring to the drawing in detail, the tool comprises a main blade 10 preferably similar to a flat trowel and is for a major portion of its length outwardly tapered as at 11 while the minor portion is reversely tapered as at 12, respectively. On the minor portion 12 of the said blade 10 at the longitudinal center of the latter is made secure through fasteners 13 a flat relatively narrow handle stock 14 having the spaced upstanding or vertically disposed handle knobs or grips 15.

The outer free end of the blade 10 is formed with a curled beveled tip 16 while removed from this tip at opposite angular edges of the tapered major portion 11 of the said blade are elongated notches or cutaway portions 17 which are overlapped by saw blades 18, these removably fastened superimposed upon the upper face of the blade 10 by terminal fasteners 19. The blades 18 are backed by heel clamps 20, these being detachably secured upon the blade 10 at the upper side thereof by removable fasteners 21 thus it being seen that the saw blades 18 can be readily detached or removed when the occasion requires.

In the use of the tool the blade 10 is slipped between overlapped shingles as made fast in a roof construction and either saw blade 18 is brought into action upon the nails securing a damaged shingle in place so that such nails can be cut and the damaged shingle freed for its removal.

The operator of the tool grasps the knobs 15 and by reciprocation sawing action can be had for the saw blades 18 in the severing of the nails fastening the shingle in place.

It is preferable to have the stock 14 carry stems or shanks 22 for the mounting of the knobs 15 thereon, the latter being preferably made of hard wood although they may be otherwise formed.

The saw blades 18 have the saw teeth 23 which are beyond the notches or cutaway portions 17 as these blades overlap the latter when carried upon the blade 10.

What is claimed is:

A shingle removing tool comprising an elongated relatively thin flat blade having converging side edges and a curled sharpened tip therebetween, saw blades arranged with the converging edges of the flat blade and having saw teeth at their outer sides aligned with said converging edges, the flat blade being cut away at the converging edges confronted by said saw blades for exposing the teeth of the latter, means detachably connecting the saw blades to the flat blade, a pair of heel clips carried by the flat blade and partially overlapping the saw blades intermediate thereof next to heel edges of said saw blades, and a double handle fixed to the flat blade in alignment with the longitudinal median thereof and disposed at right angles to the plane of the flat blade.

JAMES LANG.